No. 730,613. PATENTED JUNE 9, 1903.
F. P. COX.
METER.
APPLICATION FILED FEB. 24, 1903.
NO MODEL.
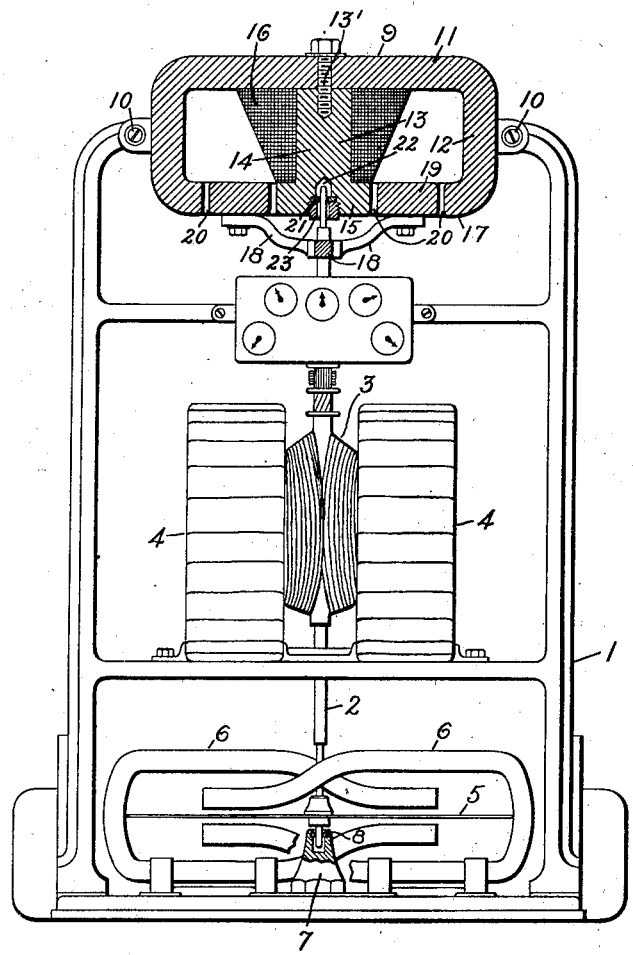
Witnesses.
George H. Tilden
Helen Oxford
Inventor.
Frank P. Cox.
by Albert G. Davis
Att'y.

No. 730,613. Patented June 9, 1903.

UNITED STATES PATENT OFFICE.

FRANK P. COX, OF LYNN, MASSACHUSETTS, ASSIGNOR TO GENERAL ELECTRIC COMPANY, A CORPORATION OF NEW YORK.

METER.

SPECIFICATION forming part of Letters Patent No. 730,613, dated June 9, 1903.

Application filed February 24, 1903. Serial No. 144,666. (No model.)

*To all whom it may concern:*

Be it known that I, FRANK P. COX, a citizen of the United States, residing at Lynn, in the county of Essex, State of Massachusetts, have invented certain new and useful Improvements in Meters, of which the following is a specification.

In electric meters of the ordinary construction the armature-shaft is vertically disposed. Owing to the accurate operation required of these meters it is desirable that the friction between the shaft and its bearings be made as little as possible.

In order to avoid any frictional trouble, I have provided means for sustaining the weight of the shaft and apparatus carried by it in such manner that no mechanical friction due to the weight of the shaft can exist. The specific means which I have devised for this purpose comprise a novel arrangement of two members formed of magnetic material, one of these members being carried by the shaft and the other supported independently of the shaft. One or both of these members produces a magnetic flux, being magnetized permanently or by current-carrying coils. The members are so arranged that the magnetic flux produced is sufficient to partially or wholly support the weight of the shaft and elements carried by it.

For a better understanding of my invention reference may be had to the accompanying drawing, which is a vertical elevation, partly in section, showing one embodiment of my invention.

Referring to the drawing, 1 represents a supporting-frame of a meter of the ordinary construction. A vertical shaft 2 carries an armature 3, which rotates within the field produced by a pair of coils 4, carried by the frame 1. At the lower end of this shaft is placed a disk 5, which coöperates with magnets 6 in the ordinary manner to produce the retarding force acting upon the armature-shaft. A tubular post 7, located at the bottom of the frame 1, carries at its upper end an annular bearing member 8. The lower end of the shaft 2 passes through this annular member and is positioned by it. The bearing member 8 may be made out of any suitable material—as, for instance, that used to form the ordinary jewel bearings of a meter.

An electromagnet 9 of the iron-clad type is secured in place at the upper end of the frame 1 in any suitable manner, as by means of screws 10. The electromagnet 9 consists of a body portion 11, which is substantially perpendicular to the shaft 2, and polar portions 12 and 13, which extend from the lower side of the portion 11. The polar extension 13 comprises an elongated cylindrical portion 14 and another cylindrical portion 15, having a diameter somewhat larger than the portion 14. Preferably the portions 14 and 15 are integral, while the portion 14 is separable from the portion 11, being secured thereto by a screw 13'. In the construction which I have illustrated a coil 16 surrounds the portion 14 of the polar extension 13, being held in place by the enlarged portion 15. The polar extension 12 may be in the form of a cylindrical body, with its axis coinciding with the axis of the shaft 2. The cylindrical portion 12 is provided at its lower end with an offset portion 17. The inner portion 17 forms a cylindrical surface, which surrounds the portion 15 of a polar extension 13, and the magnetic flux produced by the coil 16 passes between the portion 14 and the portion 17 in radial lines.

The shaft 2 carries at its upper end a plurality of arms 18, preferably formed of nonmagnetic material, and the arms 18 carry an annular mass of magnetic material, such as soft iron, which is of the proper dimensions to substantially fill the annular space between the portions 15 and 17 of the electromagnet 9. Preferably the member 19 is so proportioned as to leave small air-gaps 20 between it and the portions 15 and 17.

As will be readily understood, the magnetic flux passing between the portions 15 and 17 of the electromagnet 9 will tend to draw the armature 19 to the position in which the magnetic reluctance of the circuit will be reduced to a minimum. If the parts are properly proportioned, the joint action of the electromagnet 9 and the armature 19 will be to hold the shaft in the position shown in the drawings, in which case the weight of the shaft and armature is supported wholly independent of any mechanical bearings.

In order to guard against accidental displacement of the upper end of the shaft 2, a bearing-ring 21, which may be similar to the bearing-ring 8, is supported in an axial recess 22, formed in the lower end of the polar extension 13. The bearing-ring 21 may be secured in position by means of a perforated threaded plug 23, screwed into the lower end of a polar extension 13, as shown. While I have shown an electromagnet as the flux-producing member, it will of course be understood that a permanent magnet having the same shape could be employed.

Instead of making the peripheries of the portions 15 and 17 cylindrical, as shown and described, other shapes might be employed.

The construction which I have illustrated is especially desirable when an electromagnet is employed as the flux-producing element, owing to the advantageous location of the coil 16. The coil 16 may form a part of the resistance ordinarily included in the potential-circuit of a meter or it may be supplied with current in any other suitable way.

While I have illustrated and described the best form of my invention which is known to me, it will be readily understood that changes in the form, arrangement, and proportions of the constructions in which I have embodied my invention may be made without departing from the spirit of my invention.

What I claim as new, and desire to secure by Letters Patent of the United States, is—

1. In combination, a magnet having two poles one of which surrounds the other, and a rotatable annular armature formed of magnetic material placed between said poles and held in place by magnetic attraction.

2. In a magnetic suspension device, means for producing a radial magnetic field, a shaft to be supported, and an annular armature carried by said shaft and located in said magnetic field, the weight of said shaft being supported by the interaction between the field and the armature.

3. In a magnetic suspension device, a supporting member, a member to be supported, a magnet having two poles, one of which surrounds the other, and an annular armature placed in and substantially filling the space between said poles, the magnet being carried by one of said members and the armature by the other and the weight of the member to be supported being sustained by the magnetic attraction between the magnet and the armature.

4. In an electric meter, a vertical meter-shaft, an annular armature carried by the shaft, a magnet having a polar extension substantially in line with the axis of the shaft, and another polar extension surrounding the first-mentioned polar extension, the pole-faces being so located that the magnetic flux produced is substantially at right angles to the axis of the shaft and through the annular armature which is in the space between the two pole-pieces.

5. In combination, a supporting member, an electromagnet carried by said supporting member and provided with a central detachable pole-piece having an enlargement at its free end, its pole-face being formed by the periphery of the enlargement, another polar extension surrounding the first and separated therefrom by an annular space, a member to be supported, and an armature composed of magnetic material carried thereby, the magnetic material being shaped to substantially fill the space between the pole-pieces.

6. In combination, a supporting member, a shaft member mounted to have longitudinal movement relative to the supporting member, and means for preventing such longitudinal relative movement of the shaft member comprising a magnet having a polar projection substantially in line with the shaft member, means for causing the magnetic flux produced in the air-space surrounding said polar projection to travel in a plane substantially perpendicular to the shaft member, and an annular armature surrounding said polar projection and traversed by said flux, the armature being carried by one of said members and the magnet being carried by the other of said members.

7. In an electric meter, a supporting member, a rotary shaft member having freedom of movement longitudinally of its axis with respect to the stationary member, and means for preventing such longitudinal movement of the shaft member comprising a magnet having two poles one of which surrounds the other and an armature placed between the poles, the magnet being carried by one of the members and the armature by the other of the members.

8. In an electric meter, a supporting member, a rotatable shaft member, and means for reducing the mechanical friction between the supporting member and the shaft member comprising a magnet containing a polar extension substantially in line with the axis of the shaft member and another polar extension surrounding the first-mentioned polar extension, the pole-faces being so located that the magnetic flux produced is substantially at right angles to the axis of the shaft, a coöperating element arranged in the space between the two pole-faces, the magnet being carried by one of said members and the coöperating element being carried by the other of said members and the weight of the shaft member being supported by the interaction between the magnet and the coöperating element.

In witness whereof I have hereunto set my hand this 19th day of February, 1903.

FRANK P. COX.

Witnesses:
DUGALD McK. McKILLOP,
ALEX. F. MACDONALD.